United States Patent
Maria

(10) Patent No.: US 11,240,872 B2
(45) Date of Patent: *Feb. 1, 2022

(54) FACILITATING RESOURCE FREQUENCY MANAGEMENT FOR EMERGENCY RESPONSE

(71) Applicant: AT&T Mobility II LLC, Atlanta, GA (US)

(72) Inventor: Arturo Maria, Bellevue, WA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/830,382

(22) Filed: Mar. 26, 2020

(65) Prior Publication Data
US 2020/0229268 A1 Jul. 16, 2020

Related U.S. Application Data

(63) Continuation of application No. 15/828,812, filed on Dec. 1, 2017, now Pat. No. 10,638,539.

(51) Int. Cl.
*H04W 76/50* (2018.01)
*G06F 15/173* (2006.01)
(Continued)

(52) U.S. Cl.
CPC ...... *H04W 76/50* (2018.02); *G06F 15/17306* (2013.01); *H04L 29/08144* (2013.01); *H04W 4/90* (2018.02)

(58) Field of Classification Search
CPC ... H04W 76/50; H04W 4/90; G06F 15/17306; H04L 29/08144
See application file for complete search history.

(56) References Cited

U.S. PATENT DOCUMENTS 6,163,697 A 12/2000 Peterson et al.
6,617,964 B1 * 9/2003 Lamb ............... G01W 1/00
340/286.02
(Continued)

FOREIGN PATENT DOCUMENTS

| WO | 0156204 A1 | 1/2003 |
| WO | 2014084848 A1 | 6/2014 |
| WO | 2017023307 A1 | 2/2017 |

OTHER PUBLICATIONS

Li et al., "Drone-Assisted Public Safety Wireless broadband network", IEEE Wireless Communications and Networking Conference Workshops (WCNC), 2nd International Workshop on Device-to-Device and Public Safety Communications, 2015, pp. 323-328, IEEE, 6 pages.
(Continued)

*Primary Examiner* — Kristie D Shingles
(74) *Attorney, Agent, or Firm* — Amin, Turocy & Watson, LLP

(57) ABSTRACT

Systems and techniques facilitating resource frequency management are provided. An apparatus comprises: a processor; and a memory that stores executable instructions that, when executed by the processor, facilitate performance of operations. The operations comprise: receiving information indicative of an emergency condition in a defined area; and transmitting a command to a network device for the defined area to cause the base station device to send a communication for the emergency condition via a first wireless communication channel with a mobile device of mobile devices associated with a subscriber identity of respective subscriber identities assigned to provide a response to the emergency condition.

20 Claims, 10 Drawing Sheets

(51) Int. Cl.
*H04L 29/08* (2006.01)
*H04W 4/90* (2018.01)

(56) References Cited

U.S. PATENT DOCUMENTS

| | | | |
|---|---|---|---|
| 7,339,467 B2* | 3/2008 | Lamb | G08B 27/006 |
| | | | 340/286.02 |
| 7,565,161 B2 | 7/2009 | Sliva | |
| 7,783,299 B2* | 8/2010 | Anderson | H04W 4/90 |
| | | | 455/456.1 |
| 8,094,610 B2 | 1/2012 | Wang et al. | |
| 8,711,721 B2* | 4/2014 | Smith | H04W 36/0016 |
| | | | 370/252 |
| 8,792,340 B2 | 7/2014 | Chu et al. | |
| 9,135,808 B2 | 9/2015 | Johnson et al. | |
| 9,167,619 B2 | 10/2015 | Tucker et al. | |
| 9,226,124 B2 | 12/2015 | Schuler et al. | |
| 9,282,495 B1 | 3/2016 | McKeeman et al. | |
| 9,312,985 B2 | 4/2016 | Sanderovich | |
| 9,325,468 B2 | 4/2016 | Mitola, III | |
| 9,344,872 B2 | 5/2016 | Pandey et al. | |
| 9,391,749 B2 | 7/2016 | Amanna, III et al. | |
| 9,614,700 B2 | 4/2017 | Sanderovich | |
| 9,674,810 B2 | 6/2017 | Juncker et al. | |
| 9,681,301 B2 | 6/2017 | Mazzarella et al. | |
| 9,743,341 B2 | 8/2017 | Pinheiro et al. | |
| 10,638,539 B2* | 4/2020 | Maria | G06F 15/17306 |
| 2009/0005019 A1* | 1/2009 | Patel | G08B 27/006 |
| | | | 455/414.2 |
| 2016/0127913 A1 | 5/2016 | Li et al. | |
| 2016/0135029 A1 | 5/2016 | Johnson et al. | |
| 2016/0143075 A1 | 5/2016 | Tucker et al. | |

OTHER PUBLICATIONS

Baldini et al., "Survey of wireless communication technologies for public safety", IEEE Communications Surveys & Tutorials, 2013, vol. 16, No. 2, IEEE, 23 Pages.

Lu et al., "Clustering Schemes for D2D Communications under Partial/No Network Coverage", Vehicular Technology Conference (VTC Spring), 2014, IEEE, 6 pages.

Hallahan et al., "Enabling Public Safety Priority use of Commercial Wireless Networks", Homeland Security Affairs, 2013, vol. 9, No. 13, 28 Pages.

Yuksel et al., "Pervasive Spectrum Sharing for Public Safety ommunications", IEEE Communications magazine, Mar. 2016, pp. 22-29, vol. 54, No. 3, 8 pages.

Peha, "A Public-Private Approach to public safety communications: The Best Way to make rapid and Affordable Progress in implementing the Government's FirstNet plan is to start by taking Advantage of the Existing Commercial Infrastructure". Issues in Science and Technology, 2013, National Academy Press, 9 pages.

Non-Final Office Action received for U.S. Appl. No. 15/828,812 dated Mar. 22, 2019, 20 Pages.

Final Office Action received for U.S. Appl. No. 15/828,812 dated Jul. 10, 2019, 10 Pages.

U.S. Appl. No. 15/828,812, filed Dec. 1, 2017.

* cited by examiner

FACILITATING RESOURCE FREQUENCY MANAGEMENT FOR EMERGENCY RESPONSE

RELATED APPLICATION

The subject patent application is a continuation of, and claims priority to, U.S. patent application Ser. No. 15/828,812 (now U.S. Pat. No. 10,638,539), filed Dec. 1, 2017, and entitled "FACILITATING RESOURCE FREQUENCY MANAGEMENT FOR EMERGENCY RESPONSE," the entirety of which application is hereby incorporated by reference herein.

TECHNICAL FIELD

The subject disclosure relates generally to communications systems, and, for example, to systems, methods and/or machine-readable storage media for facilitating resource frequency management for emergency response in a communication system.

BACKGROUND

In today's society, weather and other events often call for emergency response. FirstNet is an example emergency response service that typically employs dedicated wireless communication frequencies (e.g., band 14) for communication for users of the FirstNet emergency response service. It is envisioned that separate base station devices will be purchased and deployed to support FirstNet subscriber mobile devices operating on the allocated frequencies (e.g., band 14). However, such use of dedicated frequencies for devices can be wasteful and inefficient.

DETAILED DESCRIPTION

Figure 1:
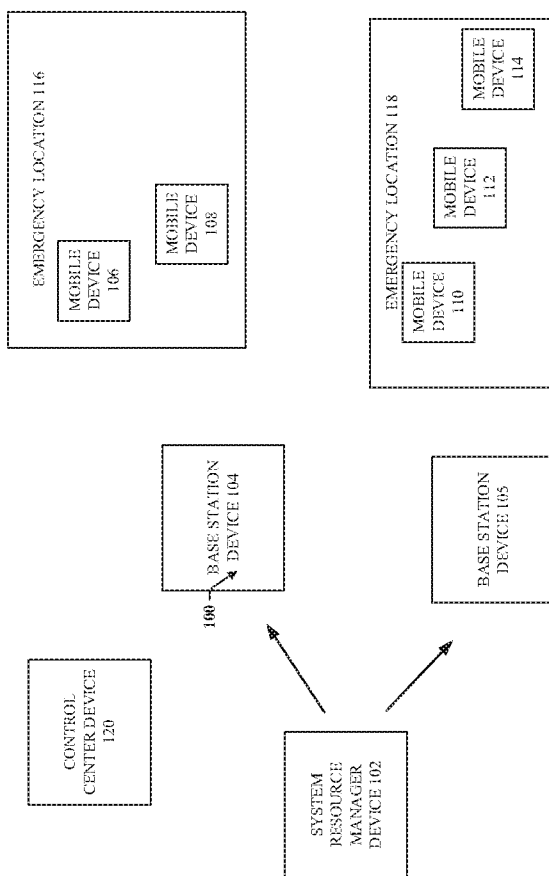
FIG. 1 illustrates an example, non-limiting block diagram of a system facilitating resource frequency management for emergency response in a communication system in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

In today's society, weather and other events often call for emergency response. FirstNet is an example emergency response service that typically employs dedicated wireless communication frequencies (e.g., band 14) for communication for users of the FirstNet emergency response service. It is envisioned that separate base station devices will be purchased and deployed to support FirstNet subscriber mobile devices operating on the allocated frequencies (e.g., band 14). However, such use of dedicated frequencies for devices can be wasteful and inefficient.

One or more embodiments described herein can employ the use of existing frequencies (e.g., commercial frequencies in some embodiments) for mobile devices to support mobile devices except when the devices are using mobile applications. This approach can result in greater efficiency in use of wireless communication system frequencies. When mobile devices associated with subscribers are using mobile applications, the Systems Resources Manager (SRM) can interface with one or more devices to direct one or more base station devices to begin to transmit and/or receive on a defined allocated frequency. The embodiments can be employed for one or more control center devices (e.g., FirstNet control centers) and/or base station devices for one or more different base station devices. The one or more base station devices can be associated with and/or controlled by one or more different carriers (e.g., AT&T, Verizon).

Systems, methods and/or machine-readable storage media for facilitating resource frequency management for emergency response in a communication system. In one embodiment, an apparatus is provided. The apparatus can comprise: a processor; and a memory that stores executable instructions that, when executed by the processor, facilitate performance of operations. The operations can comprise: receiving information indicative of an emergency condition in a defined area; and transmitting a command to a network device for the defined area to cause a base station device to switch communication for the emergency condition to a first wireless communication channel with a mobile device of mobile devices, wherein the mobile device is associated with a subscriber identity of respective subscriber identities and is assigned to provide a response to the emergency condition, and wherein the network device is distinct from the base station device.

In another embodiment, a method is provided. The method can comprise: receiving, by a device comprising a processor, information indicative of an emergency condition in a defined area; and transmitting, by the device, a command to a base station device for the defined area to cause the base station device to conduct communication for the emergency condition on a defined wireless communication channel with a mobile device of mobile devices associated with a subscriber of respective subscribers assigned to provide a response to the emergency condition.

In another embodiment, a machine-readable storage medium is provided. The machine-readable storage medium comprises executable instructions that, when executed by a processor of an apparatus, facilitate performance of operations, comprising: executing an emergency response application associated with an emergency condition in a defined area in which the apparatus is located, wherein the apparatus is configured to communicate via different wireless communication channels; transmitting information indicative of the executing of the emergency response application; and in response to receiving a command, transmitting communications from the emergency response application via a first wireless communication channel of the wireless communication channels, wherein the first wireless communication channel has been allocated to a frequency band for emergency conditions.

One or more embodiments can provide efficiencies that result from the ability to change frequencies for specific mobile emergency response applications. The ability for selected mobile devices to be able to change frequencies can allow both the carrier and the emergency response application to use frequencies only as needed to conserve spectrum. The conservation of spectrum could be significantly advantageous. For example, telecommunication carriers supporting users that are emergency responders can utilize and/or employ the system and embodiments described herein to advantage. In some cases, all carriers using particular telecommunication architecture (e.g., LTE architecture) worldwide can employ the system to bring about significant advantage.

Figure 2:
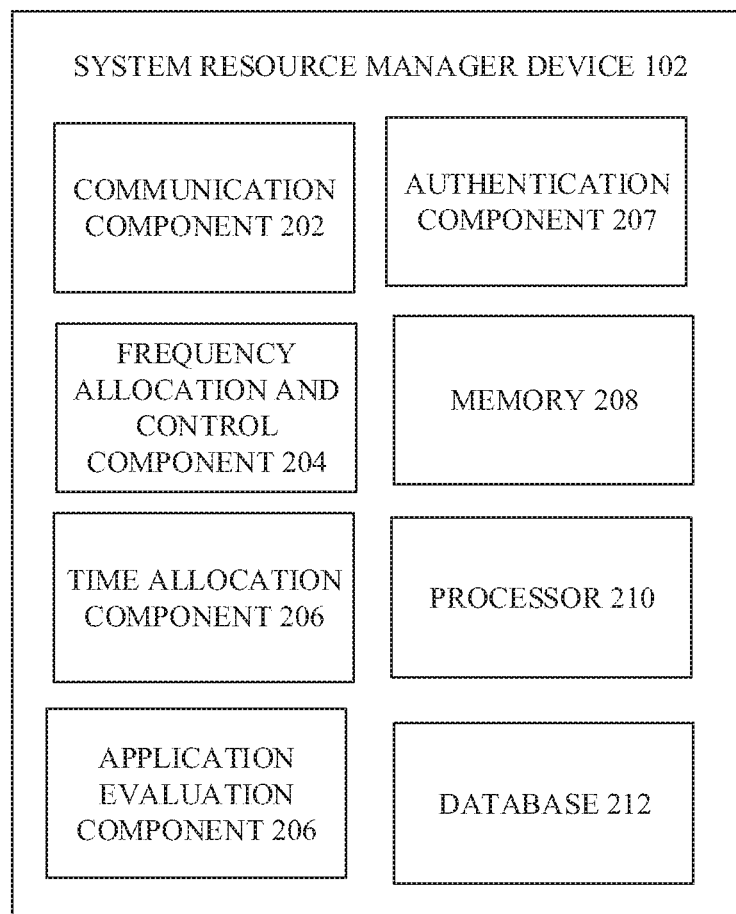
FIG. 2 illustrates an example, non-limiting block diagram of a system resource manager (SRM) device that can facilitate resource frequency management for emergency response in a communication system in accordance with one or more embodiments described herein.
Figure 3:
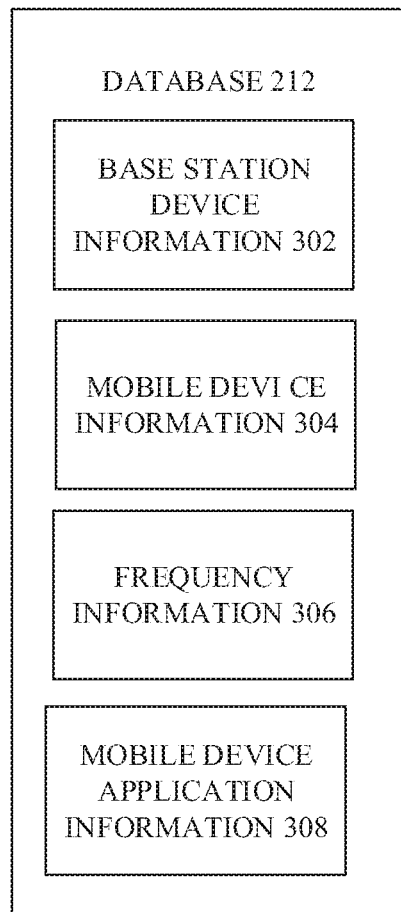
FIG. 3 illustrates an example, non-limiting block diagram of a database of an SRM that can facilitate resource frequency management for emergency response in a communication system in accordance with one or more embodiments described herein.
Figure 4:
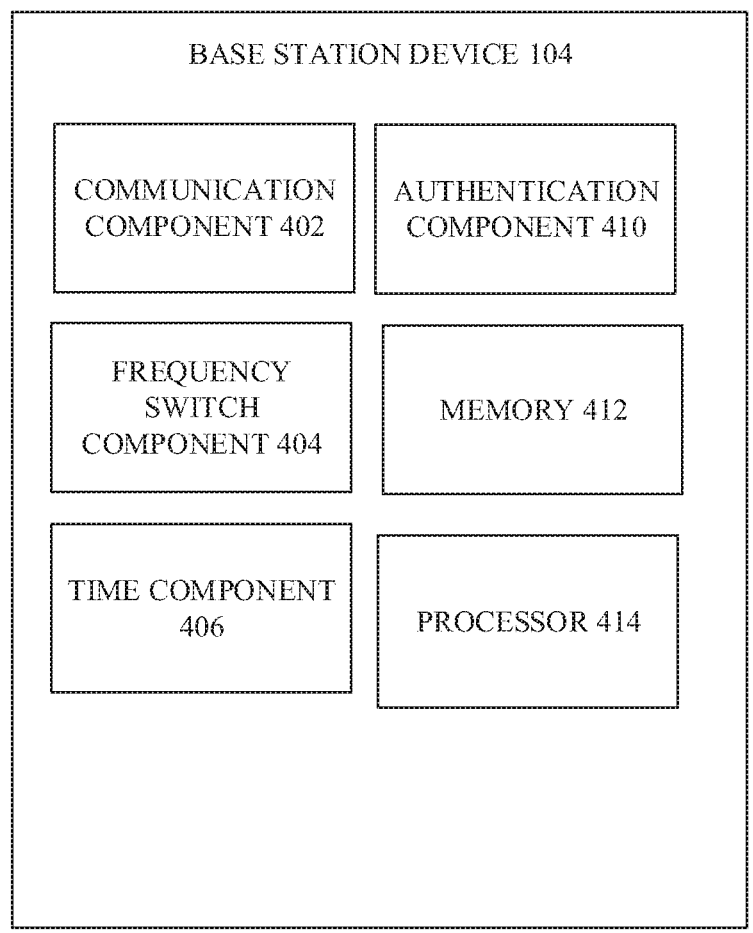
FIG. 4 illustrates an example, non-limiting block diagram of a base station device that can facilitate resource frequency management for emergency response in a communication system in accordance with one or more embodiments described herein.
Figure 5:
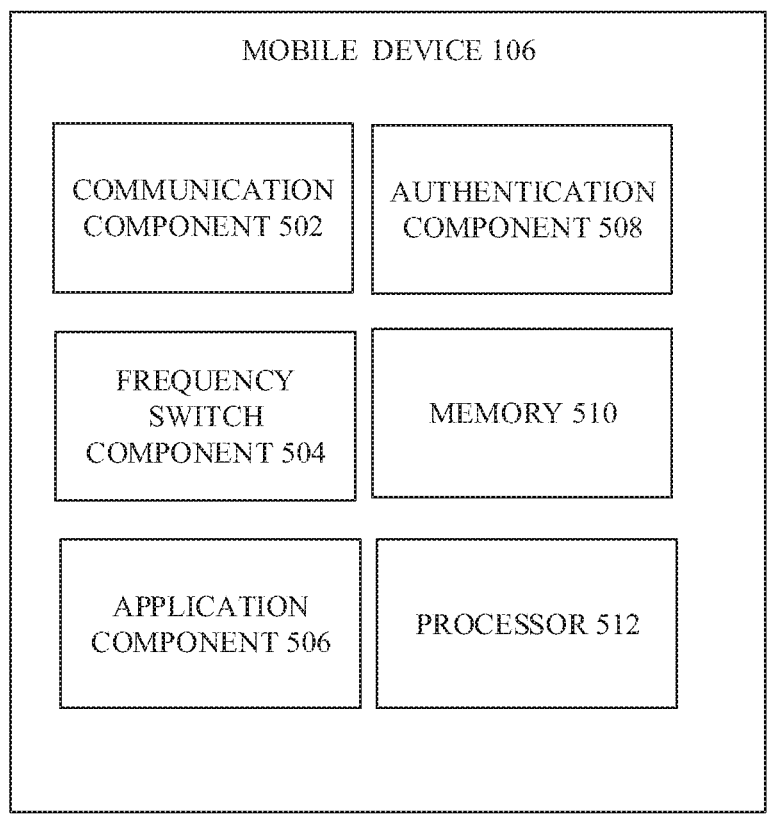
FIG. 5 illustrates an example, non-limiting block diagram of a mobile device for which resource frequency management can be facilitated for emergency response in a communication system in accordance with one or more embodiments described herein.

FIG. 1 illustrates an example, non-limiting block diagram of a system facilitating resource frequency management for emergency response in a communication system in accordance with one or more embodiments described herein. FIG. 2 illustrates an example, non-limiting block diagram of a system resource manager (SRM) device that can facilitate resource frequency management for emergency response in a communication system in accordance with one or more embodiments described herein. FIG. 3 illustrates an example, non-limiting block diagram of a database of an SRM that can facilitate resource frequency management for emergency response in a communication system in accordance with one or more embodiments described herein. FIG. 4 illustrates an example, non-limiting block diagram of a base station device that can facilitate resource frequency management for emergency response in a communication system in accordance with one or more embodiments described herein. FIG. 5 illustrates an example, non-limiting block diagram of a mobile device for which resource frequency management can be facilitated for emergency response in a communication system in accordance with one or more embodiments described herein.

Turning to FIGS. 1-5, the system 100 can comprise a SRM device 102, one or more BS devices 104, 105, and one or more mobile devices 106, 108, 110, 112, 114. In some embodiments, one or more of the mobile devices 106, 108, 110, 112, 114 can be communicatively coupled to one or more of the BS device 104, 105 and can communicate via a defined frequency band of a wireless communication channel.

As shown in FIG. 2, mobile devices 106, 108 can be associated with BS device 104 while mobile devices 110, 112, 114 can be associated with BS device 105. In some embodiments, the mobile devices can be located in regions in which an emergency has occurred and can include emergency response applications and/or software that can be executed to facilitate help during emergency conditions. As such, the mobile devices 106, 108, for example, can be located in a region designated as emergency location 116 and mobile devices 110, 112, 114 can be located in a region designed as emergency location 118.

As described, in some embodiments, the mobile devices 106, 108 can be located in proximity to an emergency location 116 and can be associated with respective emergency response users of the mobile devices 106, 108. For example, the mobile device 106 can be associated with a first emergency responder for a first emergency located at emergency location 116 while mobile device 108 can be associated with a second emergency responder for a second emergency responder for the first emergency located at the emergency location 116.

In some embodiments, the mobile devices 110, 112, 114 can be located in proximity to an emergency location 118 and can be associated with respective emergency response users of the mobile devices 110, 112, 114. For example, the mobile device 110 can be associated with a second emergency responder for a second emergency located at emergency location 118 while mobile device 112 can be associated with a second emergency responder for a second emergency responder for the first emergency located at the emergency location 118 and while mobile device 114 can be associated with the second emergency responder for a third emergency responder for the second emergency located at the emergency location 118.

In some embodiments, SRM device 102 can reside externally to a defined network (e.g., a network associated with BS device 104, 105) and the communication component 202 of the SRM device 102 can instruct various network elements and/or subscriber mobile devices (e.g., mobile devices 106, 108, 110, 112, 114) as to which frequencies to use for specific mobile applications (e.g., emergency response applications or FirstNet applications). For example, the frequency allocation and control component 204 can select a wireless communication channel/frequency and/or generate one or more commands that can be received by a communication component 402 of BS device 104 to cause the frequency switch component 404 of the BS device 104 to transmit and/or receive emergency response communications to/from the mobile device 106 of the emergency location 116.

In some embodiments, the frequency allocation and control component 204 can control a BS device 102 to enable the emergency frequency/wireless communication channel to be employed for non-emergency use by the BS device 104 and/or the mobile devices associated with the emergency response subscribers if there is no emergency for which the frequency/wireless communication channel is needed. In some embodiments, the SRM device 102 can communicate to other network elements (e.g., carriers (not shown)) in addition to or as an alternative to communicating to the BS device. In some embodiments, the SRM device 102 can communicate to the carrier and/or the BS device to inform the carrier and/or the BS device to not communicate on the band designated for emergency response applications. Accordingly, in various embodiments, the SRM device 102 can communicate to use a desired frequency/wireless communication channel, to not use a desired frequency/wireless communication channel and such can be communicated to a BS device, a carrier, a mobile device or any other network element.

In some embodiments, the SRM device 102 can receive information about number of different emergency response mobile applications that can be executed on the mobile devices 106, 108, 110, 112, 114. In some embodiments, these mobile applications can execute on subscriber devices (e.g., mobile devices 106, 108, 110, 112, 114) that use particular frequencies allocated to a defined frequency/communication channel/network (e.g., FirstNet frequency/communication channel/network). In some embodiments, the frequency/wireless communication channel for the network for the emergency responder device (e.g., mobile device 106, 108 in emergency location 116, for example) can be band 14. In other embodiments, any band can be designated.

In various embodiments, during non-emergency conditions, the SRM device 102 can allow the mobile devices 106, 108, for example, to operate in any frequency band. Thus, frequency switch component 504 of the mobile device 106 can operate in a standard frequency for wireless communications for non-emergency scenarios. However, when or after the mobile device application component 506 executes the emergency response mobile application, the SRM device 102 can receive a notification of such and determine a frequency to which the frequency switch component 504 of the mobile device 106 should switch for emergency response mobile application communications.

In particular, in some embodiments, the application evaluation component 206 of the SRM device 102 can determine that an emergency response mobile application has been execute at the mobile device 106. SRM device 102 can instruct the mobile device (e.g., mobile device 106) for the emergency responder and the BS device 104 to which the mobile device is attached to change frequencies and use an allocated emergency band (e.g., an allocated FirstNet band). This will allow mobile device emergency response users and the emergency (e.g., FirstNet) network providers (e.g., AT&T) to use any frequency except when a particular emergency (e.g., FirstNet) mobile device application is executed in which case the SRM device 102, BS device 104 and mobile device 106 would switch to the defined frequency directed by the SRM device 102. The frequency allocation and control component 204 of the SRM device 102 can determine the frequency and the time allocation component 206 can indicate a particular duration of time, in some embodiments, during which the emergency frequency should be employed by the BS device 104 and/or the mobile device 106.

The advantages of the various embodiments are flexibility, the ability to conserve and strategically manage spectrum which can be highly monetized. Further, one or more embodiments can employ existing commercial frequencies to support FirstNet or other emergency response subscribers except when they are actually using mobile applications. When this occurs, the SRM device 102 can interface with the control center devices (e.g., control center device 12) and a BS device (and/or other network resources) associated with one or more different telecommunication carriers (e.g., AT&T, Verizon, Sprint) to direct the BS device for the carrier to change to an allocated frequency.

In some embodiments, a SRM device 102 can be a network element which would reside external to a core network (e.g., ATT core network). The SRM device 102 can transmit and/or receive information that can enable the SRM device 102 to have awareness of mobile devices associated with one or more (or, in some embodiments, all) emergency responders (e.g., all FirstNet users) and which applications the mobile devices of the emergency responders are running.

In some embodiments, the SRM device 102 can be closely interfaced with any number of different types of carriers (e.g., AT&T or other carriers) (or other carriers) or network elements (e.g., gateways, evolved packet cores (EPCs)). In some embodiments, the SRM device 102 can interface with additional network elements residing in a particular network to which the SRM device 102 is communicatively coupled. In various embodiments, the SRM device 102 can be implemented as hardware or software. In some embodiments, the SRM device 102 can be or be included as part of a Network Functions Virtualization (NFV) component and/or a Software Defined Networking (SDN) component within a defined network and/or outside of a defined network.

When a mobile device for an emergency responder starts execution of an application (or receives information indicative of a command from a user to start a mobile application), the SRM device 102 can receive a signal or other information notifying the SRM device 102 of the start of the mobile application. The mobile application triggering such notification can be an application associated with emergency response assistance for example.

In some embodiments, the notification can be received by the SRM device 102 from the mobile device 106 for the emergency responder and/or from a control center device 102 associated with the emergency response system (e.g., FirstNet control center device). The SRM device 102 can receive this notification or request. The SRM device 102 can be configured with intelligence to determine which specific frequency within the emergency response frequencies (e.g., FirstNet band) of communication channels allocated should be used for the particular application communication for the mobile device 106. Emergency response frequencies can be defined wireless communication channels for example.

In some embodiments, the emergency response frequencies can be numerous. Different emergencies can be associated different frequencies/wireless communication channels for instances in which one emergency may occur at a first emergency location 116 and a second emergency occurs at second emergency location 118 such as that which may occur if numerous areas, states or countries are damaged via multiple different hurricanes or other weather conditions and help efforts are concurrently ongoing in more than one location.

Once the frequency allocation and control component 204 of the SRM device 102 decides which frequency to use, the SRM device 102 can instruct the core network elements (e.g., AT&T core network elements) and/or the BS device (e.g., AT&T BS device) to change frequencies for a particular mobile device associated with the emergency response application that is being executed within the defined region covered by the BS device. By way of example, but not limitation, in one embodiment, if mobile device 106 or mobile device 108 executes the emergency application, information can be received by the SRM device 102 (which can be transmitted by the communication component 402 of the mobile device 106 in some embodiments) notifying the SRM device 102 via the BS device 104, the control center device 120 or any other network element. The SRM device 102 can then transmit a command to the control center device 120 and/or the frequency switch component 404 and/or the time component 406 of the BS device 104 for the mobile device 106, for example.

In some embodiments, the BS device 104 and the SRM device 102 can perform an authentication process to ensure that the SRM device 102 is legitimate. For example, the authentication component 410 of the BS device 104 can communicate with the authentication component 207 of the SRM device 102 prior to or during or after receipt of the command from the SRM device 102 for the BS device 104 and the mobile device (e.g., mobile device 106) to communicate over the desired emergency frequency/wireless communication channel. In some embodiments, the mobile device 106 can authenticate the BS device 104 prior to changing to the commanded frequency/wireless communication channel via employing the authentication component 508 of the mobile device 106.

The command received from the SRM device 102 can cause the BS device 104 to begin communication with the mobile device that executed the emergency application on a specific defined frequency/wireless communication channel.

The command can also cause the BS device 104 to command the mobile device 106 to communicate on such frequency/wireless communication channel in some embodiments.

Accordingly, in some embodiments, the BS device 104 can have the flexibility to change frequencies for communication with a particular mobile device (e.g., mobile device 106 or mobile device 108), and/or to cause or command the mobile device to communicate on the defined frequency/wireless communication channel for emergency response operations and/or emergency applications. Thus, the mobile device receiving the command and/or the BS device transmitting the command can be configured to communicate over different frequencies/wireless communication channels. In some embodiments, the mobile device and/or the BS device can communicate over a first defined frequency/wireless communication channel determined by the SRM device 102 for communication associated with the emergency application and communicate over a different frequency/wireless communication channel for communications not associated with the emergency application.

In some embodiments, the mobile device can re-attach to the BS device setting up communication and/or starting an authentication process for communication over the new, desired emergency frequency/wireless communication channel. Accordingly, during re-attachment, the mobile device can cease communication on a first frequency and re-start the process of communicating with the BS device on a second frequency. In some embodiments, the mobile device can communicate information from/to the emergency response mobile application over a first frequency identified by the SRM device 102 and communicate other information from/to other non-emergency response mobile applications over a second frequency. The communication over the first and second frequencies can be concurrent in some embodiments.

In some embodiments, the time component 406 of the BS device can transmit information to the mobile device to change frequencies for a particular application for a defined duration of time. When the defined duration of time has ended, the mobile device can automatically revert to use of the previous communication channel being used by the mobile device prior to the command from the SRM device 102 to change to the particular channel designated for emergency response communication.

In some embodiments, to begin communicating on the new frequency/wireless communication channel, after receipt of the command, the mobile device can change frequencies and re-attach to the BS device on the new frequency for the duration of the use of the particular emergency response mobile application by the mobile device.

In some embodiments, to facilitate one or more of the embodiments herein, the SRM device 102 can receive and/or access mobile device information 304, frequency information 306, mobile device application information 308 and/or BS device information 302 as shown with reference to FIG. 3 for database 212. For example, the database 212 can include information enabling the SRM device 102 to be aware of or have information stored identifying one or more or all mobile devices associated with emergency responders, which frequencies the mobile devices associated with the emergency responders are using and/or what mobile applications these mobile devices are using. In some embodiments, the SRM device 102 can communicate one or more aspects of this information above to emergency response (e.g., FirstNet) agencies and/or control center devices (e.g., control center device 120). The information can be reported to the SRM device 102 and updated at the SRM device 102 or updated at a repository accessible by the SRM device 102 from time to time. The repository can be database 212 in some embodiments.

In some embodiments, the BS device can have a network virtualized function (NFV) that would enable the BS device to interface with the SRM device 102 and/or also change frequencies dynamically. In some embodiments, the SRM device 102 can have or access via a network, a repository (e.g., database 212) that would store history of mobile devices, subscribers and/or frequency changes.

In some embodiments, the SRM device 102 can have a security catalog and/or repository listing one or more (or, in some embodiments, all) BS devices in the system, which BS devices would be allowed to be changed and which mobile devices would have the ability to change frequencies.

In some embodiments, the SRM device 102 can interface with mobility management entities (MMEs) and/or home subscriber server (HSS) devices in order to ensure that authentication mechanisms are followed and are consistent if an emergency response subscriber needs to employ his/her mobile device to re-attach to the BS device and/or re-authenticate the BS device. In some embodiments, the SRM device 102 can interface with Internet Protocol Multimedia Subsystem (IMS) core devices and/or applications residing in a particular carrier network and/or the same mechanisms described in this disclosure would be used for IMS applications.

In some embodiments, the memory 208 can store computer executable components that can be executed by processor 210 to perform one or more of the functions for SRM device 102. For example, the memory 208 can store computer executable components that can perform generation of information to command a BS device and/or a network device to cause the BS device to communicate on a defined frequency/wireless communication channel with a defined mobile device based on the mobile device executing an emergency response mobile application.

In some embodiments, the memory 208 can store computer executable components that can be executed by processor 210 to perform one or more of the functions for SRM device 102. For example, the memory 208 can store computer executable components that can perform generation of information to command a BS device and/or a network device to cause the BS device to communicate on a defined frequency/wireless communication channel with a defined mobile device based on the mobile device executing an emergency response mobile application.

In some embodiments, the memory 412 can store computer executable components that can be executed by processor 414 of BS device 104. Memory 510 can store computer executable components that can be executed by processor 512 of mobile device 106.

In some embodiments, the mobile device can be a handheld device, a personal computer (PC) and/or a vehicle device (or a device configured to communicatively coupled to a vehicle or communicative to a network or BS device of the network via the vehicle or directly communicate with the BS device).

The database 212 of the SRM device 102 can be a database that maintains information about tens or hundreds or millions of these devices, and can record/store information about what applications these devices are using. The SRM device can have hardware and/or software (e.g., a software agent such as the application evaluation component 206) that can determine that a mobile device identified in the database 212 has launched and/or executed a particular emergency response mobile application at a particular location at a particular date and time.

In various embodiments, the SRM device 102 can be communicatively coupled to one or more other SRM devices in other regions in the United States or world. For example, Washington and Oregon BS devices can be connected to a particular carrier that has an associated SRM device that controls the carrier and/or BS device. BS devices on the East Coast can be connected to a particular carrier that has an associated SRM device that controls the carrier and/or BS devices that are associated with the carrier. The SRM that controls the devices on the East Coast can be communicatively coupled to the SRM device that controls the devices in Washington and Oregon.

In some embodiments, for example, if there is a hurricane in Fort Lauderdale, the SRM device 102 can decide that every mobile device that executes the emergency response mobile application should use a defined selected frequency/wireless communication channel (e.g., band 14) while deciding that commercial carrier devices should use another frequency/wireless communication channel for non-emergency communications. The BS devices in the region associated with the carrier and/or that receive commands from the SRM device to communicate on the defined frequency/wireless communication channel for emergency communications can communicate such information to the mobile devices that have the emergency response capability in some embodiments. Thus, the BS device can generate information to disseminate to other mobile devices upon receiving a command from SRM device telling the BS device to begin to communicate with mobile devices having emergency traffic on a defined channel.

FIGS. 6, 7, 8 and 9 illustrate flowcharts of methods that facilitate resource frequency management for emergency response in a communication system in accordance with one or more embodiments described herein.

Figure 6:
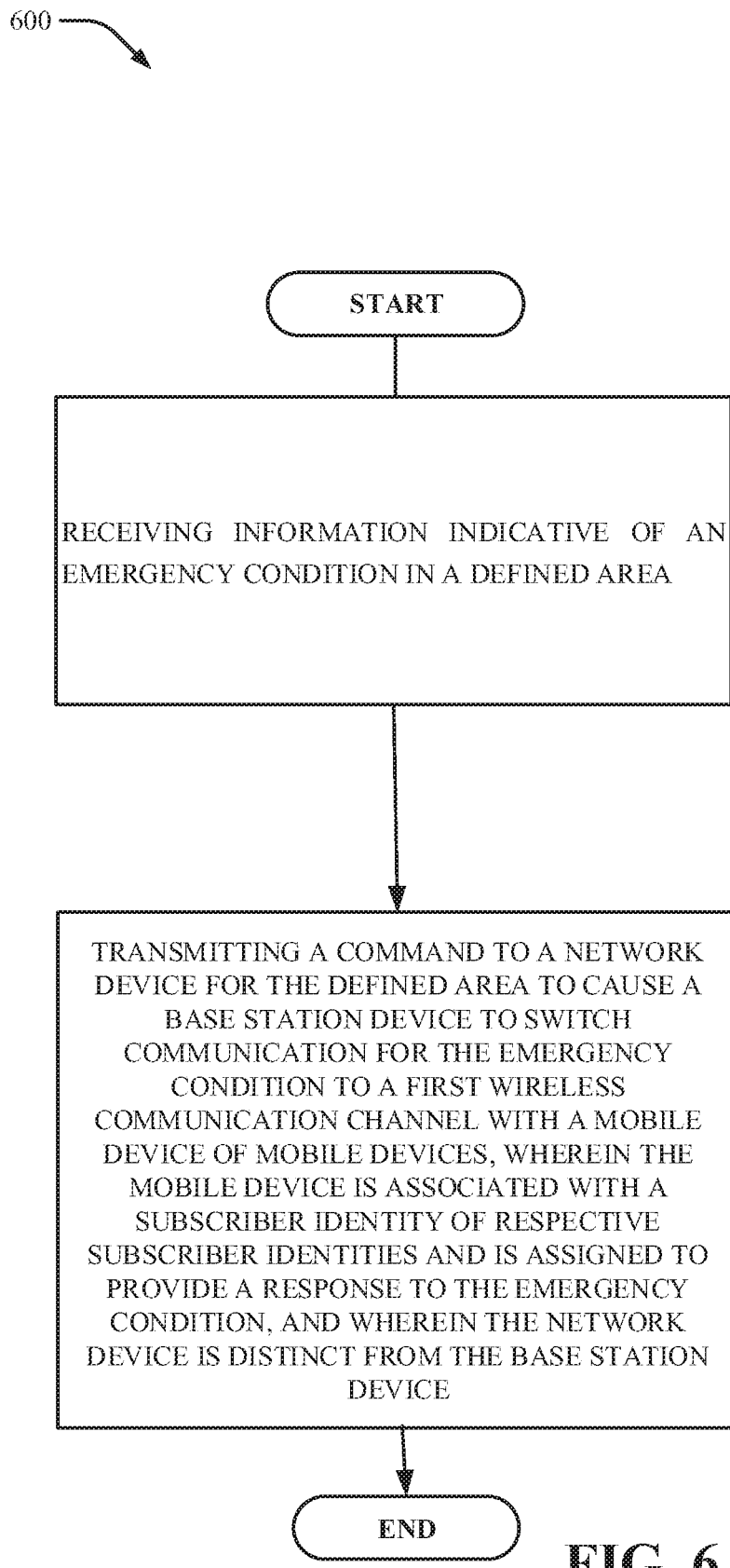
FIGS. 6, 7, 8 and 9 illustrate flowcharts of methods that facilitate resource frequency management for emergency response in a communication system in accordance with one or more embodiments described herein.

Turning first to FIG. 6, at 602, method 600 can comprise receiving information indicative of an emergency condition in a defined area. At 604, method 600 can comprise transmitting a command to a network device for the defined area to cause a base station device to switch communication for the emergency condition to a first wireless communication channel with a mobile device of mobile devices, wherein the mobile device is associated with a subscriber identity of respective subscriber identities and is assigned to provide a response to the emergency condition, and wherein the network device is distinct from the base station device. In some embodiments, the transmitting the command is based on switching from a second wireless communication channel via which the base station device was communicating with the mobile device prior to the receiving the information indicative of the emergency condition in the defined area. In some embodiments, transmitting the command comprises transmitting the command to the base station device to enable the mobile devices to communicate with one another via the first wireless communication channel.

Figure 7:
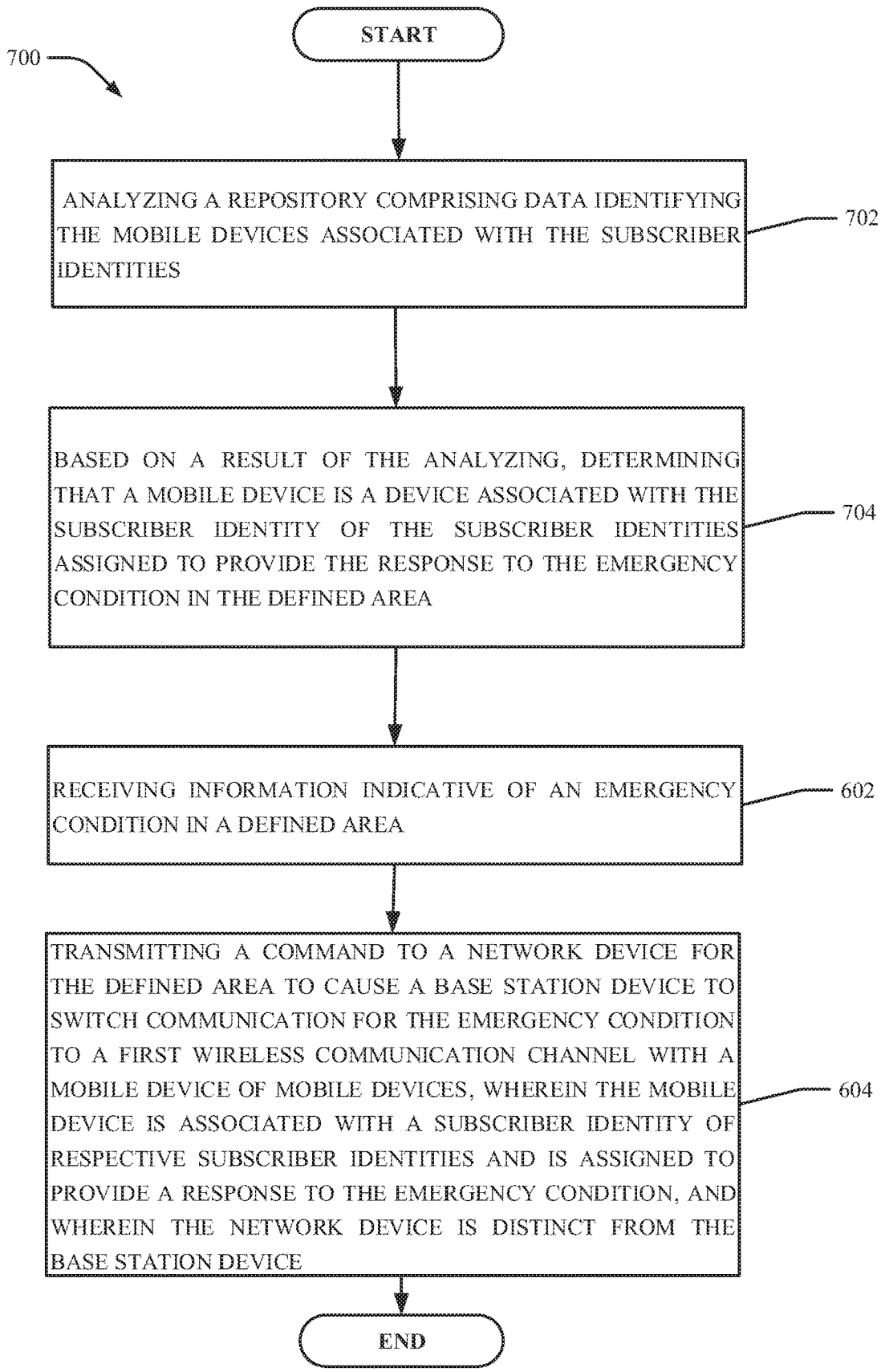

Turning now to FIG. 7, at 702, method 700 can also comprise analyzing a repository comprising data identifying the mobile devices associated with the subscriber identities. At 704, method 700 can comprise, based on a result of the analyzing, determining that the mobile device is a device associated with the subscriber identity of the subscriber identities assigned to provide the response to the emergency condition in the defined area. Method 700 can also comprise 602 and 604 of method 600.

In some embodiments, the first wireless communication channel is a communication channel designated for emergency response communications.

In some embodiments, the information indicative of the emergency condition in the defined area is received by the apparatus as a result of an emergency computer executable application being initiated by the mobile device in the defined area or by a second mobile device of the mobile devices in the defined area.

In some embodiments, the method (although not shown) can also comprise selecting the first wireless communication channel from wireless communication channels allocated for emergency response communication, and wherein the selecting is performed prior to the transmitting.

In some embodiments, the information is first information, wherein the emergency condition is a first emergency condition, wherein the defined area is a first defined area, wherein the command is a first command, wherein the base station device is a first base station device, wherein the communication is a first communication, wherein the mobile device of the mobile devices associated with the respective subscriber identities is a first mobile device of first mobile devices associated with respective first subscriber identities, wherein the response is a first response. A method (not shown) can comprise receiving second information indicative of a second emergency condition in a second defined area. This particular method can also comprise transmitting a second command to a second base station device for the second defined area to cause the second base station device to send a second communication for the second emergency condition via a second defined wireless communication channel with a second mobile device of second mobile devices associated with respective second subscriber identities assigned to provide a second response to the second emergency condition, wherein the first defined area does not overlap with the second defined area, and wherein a first time period of occurrence of the first emergency condition is concurrent with a second time period of occurrence of the second emergency condition.

In some embodiments, method can also comprise updating a data store to comprise device identities for the mobile devices and application identities for computer executable applications being executed by the mobile devices.

In some embodiments, the method (not shown) can also comprise receiving the information indicative of the emergency condition comprises receiving the information via a control center device communicatively coupled to the mobile device and the apparatus.

Figure 8:
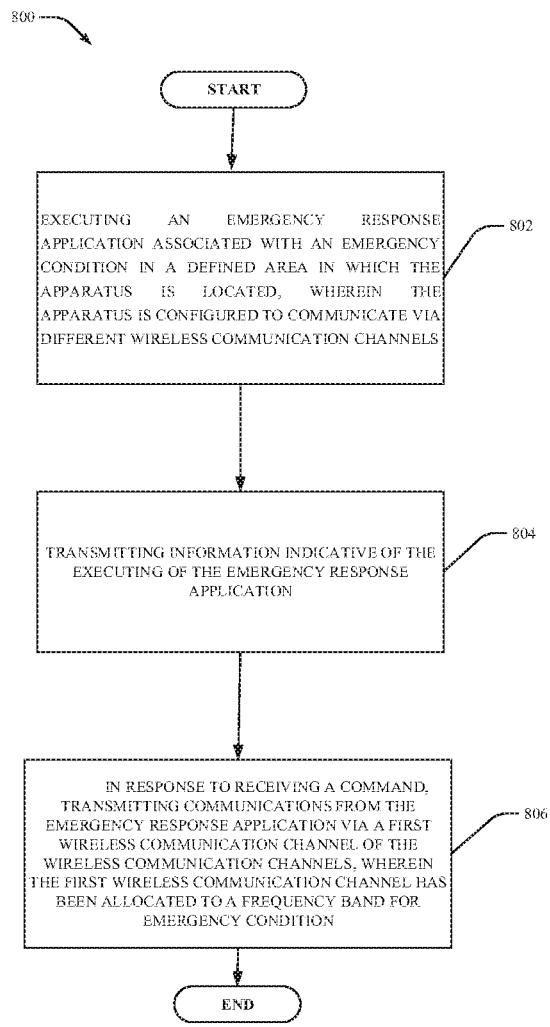

Turning now to FIG. 8, at 802, method 800 can comprise executing an emergency response application associated with an emergency condition in a defined area in which the apparatus is located, wherein the apparatus is configured to communicate via different wireless communication channels. At 804, method 800 can comprise transmitting information indicative of the executing of the emergency response application. At 806, method 800 can comprise in response to receiving a command, transmitting communications from the emergency response application via a first wireless communication channel of the wireless communication channels, wherein the first wireless communication channel has been allocated to a frequency band for emergency conditions.

Figure 9:
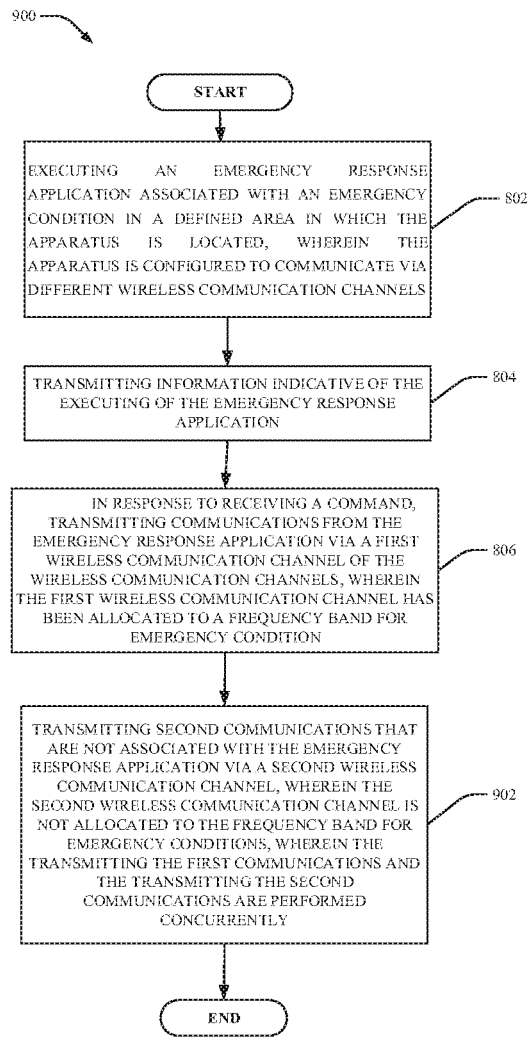

Turning now to FIG. 9, method 900 includes 802, 804, 806 of method 800. At 902, method 900 can comprise transmitting second communications that are not associated with the emergency response application via a second wireless communication channel, wherein the second wireless communication channel is not allocated to the frequency band for emergency conditions, and wherein the transmitting the first communications and the transmitting the second communications are performed concurrently.

Figure 10:
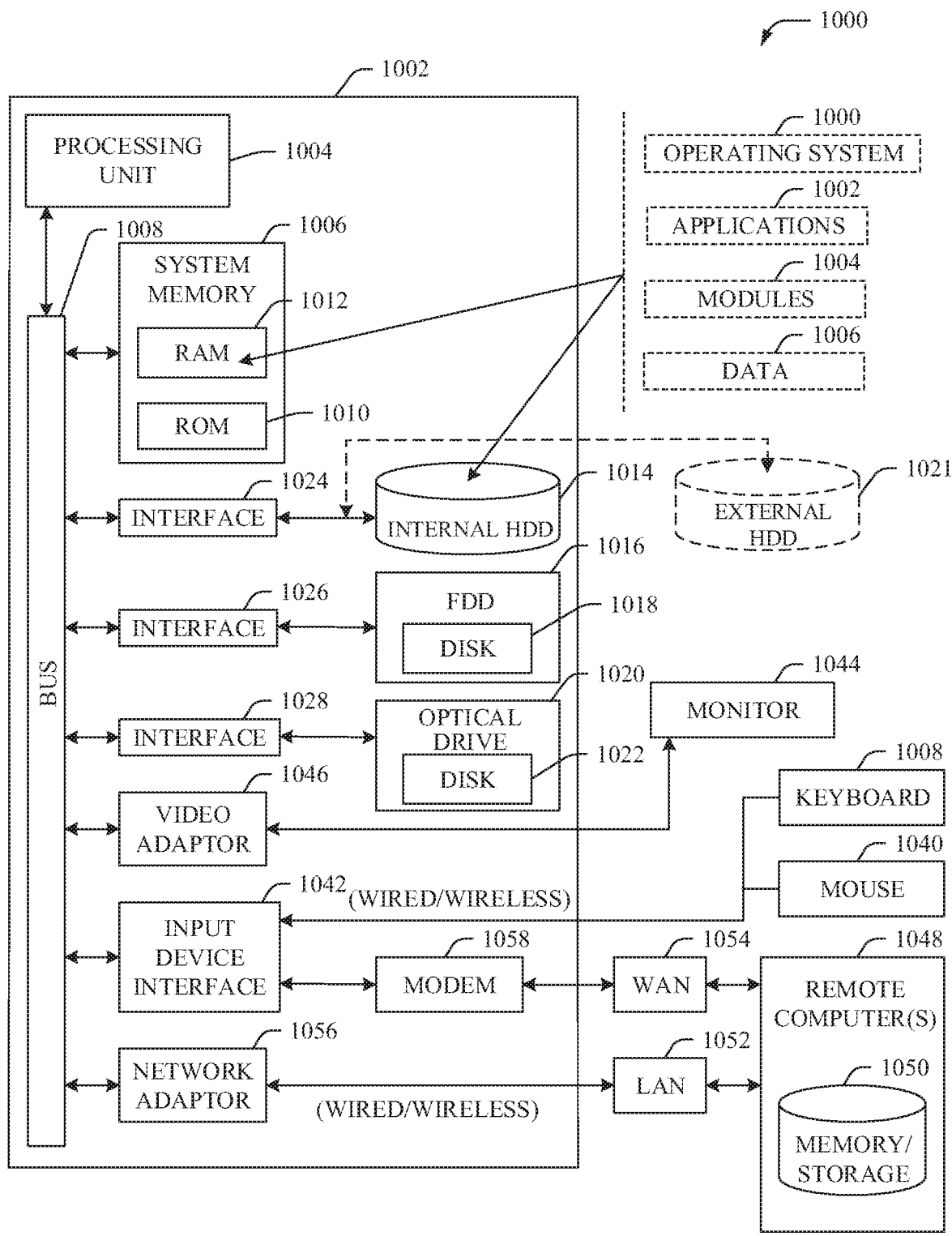
FIG. 10 illustrates a block diagram of a computer that can be employed in accordance with one or more embodiments described herein.

FIG. 10 illustrates a block diagram of a computer that can be employed in accordance with one or more embodiments. Repetitive description of like elements employed in other embodiments described herein is omitted for sake of brevity.

In some embodiments, the computer, or a component of the computer, can be or be comprised within any number of components described herein comprising, but not limited to, base station device 102 or mobile device 104 (or a component of base station device 102 or mobile device 104). In order to provide additional text for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules comprise routines, programs, components, data structures, etc., that perform particular tasks or implement particular abstract data types. Moreover, those skilled in the art will appreciate that the various methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable (or machine-readable) storage media and/or communications media, which two terms are used herein differently from one another as follows. Computer-readable (or machine-readable) storage media can be any available storage media that can be accessed by the computer (or a machine, device or apparatus) and comprises both volatile and nonvolatile media, removable and non-removable media. By way of example, and not limitation, computer-readable (or machine-readable) storage media can be implemented in connection with any method or technology for storage of information such as computer-readable (or machine-readable) instructions, program modules, structured data or unstructured data. Tangible and/or non-transitory computer-readable (or machine-readable) storage media can comprise, but are not limited to, random access memory (RAM), read only memory (ROM), electrically erasable programmable read only memory (EE-PROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable (or machine-readable) storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable (or machine-readable) media, is to be understood to exclude only propagating intangible signals per se as a modifier and does not relinquish coverage of all standard storage, memory or computer-readable (or machine-readable) media that are not only propagating intangible signals per se.

In this regard, the term "non-transitory" herein as applied to storage, memory or computer-readable (or machine-readable) media, is to be understood to exclude only propagating transitory signals per se as a modifier and does not relinquish coverage of all standard storage, memory or computer-readable (or machine-readable) media that are not only propagating transitory signals per se.

Communications media typically embody computer-readable (or machine-readable) instructions, data structures, program modules or other structured or unstructured data in a data signal such as a modulated data signal, e.g., a channel wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 10, the example environment 1000 for implementing various embodiments of the embodiments described herein comprises a computer 1002, the computer 1002 comprising a processing unit 1004, a system memory 1006 and a system bus 1008. The system bus 1008 couples system components comprising, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 comprises ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also comprise a high-speed RAM such as static RAM for caching data.

The computer 1002 further comprises an internal hard disk drive (HDD) 1010 (e.g., EIDE, SATA), which internal hard disk drive 1014 can also be configured for external use in a suitable chassis (not shown), a magnetic floppy disk drive 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface, respectively. The interface 1024 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable (or machine-readable) storage media provide nonvolatile storage of data, data structures, computer-executable instructions, and so forth. For the computer 1002, the drives and storage media accommodate the storage of any data in a suitable digital format. Although the description of computer-readable (or machine-readable) storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1012, comprising an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A communication device can enter commands and information into the computer 1002 through one or more wired/wireless input devices, e.g., a keyboard 1038 and a pointing device, such as a mouse 1040. Other input devices (not shown) can comprise a microphone, an infrared (IR) remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 1394 serial port, a game port, a universal serial bus (USB) port, an IR interface, etc.

A monitor 1044 or other type of display device can be also connected to the system bus 1008 via an interface, such as a video adapter 1046. In addition to the monitor 1044, a computer typically comprises other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically comprises many or all of the elements described relative to the computer 1002, although, for purposes of brevity, only a memory/storage device 1050 is illustrated. The logical connections depicted comprise wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also comprise a wireless AP disposed thereon for communicating with the wireless adapter 1056.

When used in a WAN networking environment, the computer 1002 can comprise a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, $x=(x1, x2, x3, x4, \ldots, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a communication device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing communication device behavior, operator preferences, historical information, receiving extrinsic information). For example, SVMs can be configured via a learning or training phase within a classifier constructor and feature selection module. Thus, the classifier(s) can be used to automatically learn and perform a number of functions, comprising but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of communication device equipment. A processor can also be implemented as a combination of computing processing units.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable (or machine-readable) storage media, described herein can be either volatile memory or nonvolatile memory or can comprise both volatile and nonvolatile memory.

Memory disclosed herein can comprise volatile memory or nonvolatile memory or can comprise both volatile and nonvolatile memory. By way of illustration, and not limitation, nonvolatile memory can comprise read only memory (ROM), programmable ROM (PROM), electrically programmable ROM (EPROM), electrically erasable PROM (EEPROM) or flash memory. Volatile memory can comprise random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above comprises mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:

1. An apparatus, comprising:
   a processor; and
   a memory that stores executable instructions that, when executed by the processor, facilitate performance of operations, comprising:
   receiving information indicative of an emergency condition in a defined area, wherein the emergency condition is one of emergency conditions; and
   transmitting a command signal from the apparatus to network equipment for the defined area, wherein the command signal is interpreted and causes base station equipment to switch communication for the emergency condition to a defined first wireless communication channel with a mobile device of mobile devices, wherein the command signal identifies a first defined frequency for the mobile device to employ for a first defined application for the emergency condition, wherein the command signal further identifies a second defined frequency for the mobile device to employ for a second defined application for the emergency condition, and wherein the first wireless communication channel was designated for use for the emergency conditions prior to occurrence of the emergency condition.

2. The apparatus of claim 1, wherein the mobile device is associated with a subscriber identity of respective subscriber identities, and wherein the operations further comprise:
   analyzing a repository comprising data identifying the mobile devices associated with the respective subscriber identities; and
   based on a result of the analyzing, determining that the mobile device is a device associated with the subscriber identity of the respective subscriber identities assigned to provide the response to the emergency condition in the defined area.

3. The apparatus of claim 2, wherein transmitting the command is based on switching from a second wireless communication channel via which the base station equipment was communicating with the mobile device prior to receiving the information indicative of the emergency condition in the defined area.

4. The apparatus of claim 1, wherein the first wireless communication channel is a communication channel designated for emergency response communications.

5. The apparatus of claim 1, wherein the information indicative of the emergency condition in the defined area is received by the apparatus as a result of an emergency computer executable application being initiated by the mobile device in the defined area or by a second mobile device of the mobile devices in the defined area.

6. The apparatus of claim 1, wherein transmitting the command comprises transmitting the command to the base station equipment to enable the mobile devices to communicate with one another via the first wireless communication channel.

7. The apparatus of claim 1, wherein the operations further comprise selecting the first wireless communication channel from wireless communication channels allocated for emergency response communication, and wherein the selecting is performed prior to the transmitting.

8. The apparatus of claim 1, wherein the command causes the base station equipment to send the communication with an instruction to provide the response to the emergency condition for a limited duration of time specified by the command.

9. The apparatus of claim 8, wherein the command causes the base station equipment to send the communication with an instruction to provide the response to the emergency condition for a specified application executed via the mobile device.

10. The apparatus of claim 8, wherein the command further causes the base station equipment to send the communication for the mobile device via a second wireless communication channel distinct from the first wireless communication channel.

11. The apparatus of claim 1, wherein the command further causes the base station equipment to send re-attachment information to the mobile device enabling the mobile device to re-attach to the base station equipment to communicate via the first wireless communication channel.

12. The apparatus of claim 1, wherein the operations further comprise updating a data store to comprise device identities for the mobile devices and application identities for computer executable applications being executed by the mobile devices.

13. The apparatus of claim 1, wherein receiving the information indicative of the emergency condition comprises receiving the information via a control center device communicatively coupled to the mobile device and the apparatus.

14. A method, comprising:
receiving, by a device coupled to a processor, information indicative of an emergency condition in a defined area, wherein the emergency condition is one of emergency conditions; and
transmitting, by the device, a command signal to network equipment for the defined area to cause a base station to change frequencies to a first wireless communication channel to facilitate communication for the emergency condition with a mobile device of mobile devices, wherein the command signal identifies a first frequency of the frequencies for the mobile device to employ for a first defined application for the emergency condition and a second frequency of the frequencies for the mobile device to employ for a second defined application for the emergency condition, and wherein the first wireless communication channel to which the command signal causes the base station to change is designated for use for the emergency conditions prior to occurrence of the emergency condition.

15. The method of claim 14, wherein the mobile device is associated with a subscriber identity of respective subscriber identities, and the method further comprising:
analyzing, by the device, a store comprising data identifying the mobile devices associated with the respective subscriber identities; and
based on a result of the analyzing, determining, by the device, that the mobile device is a device associated with the subscriber identity of the respective subscriber identities assigned to provide the response to the emergency condition in the defined area.

16. The method of claim 15, wherein transmitting the command is based on switching from a second wireless communication channel via which the base station was communicating with the mobile device prior to receiving the information indicative of the emergency condition in the defined area.

17. The method of claim 14, wherein the information indicative of the emergency condition in the defined area is received by the device as a result of an emergency computer executable application being initiated by the mobile device in the defined area or by a second mobile device of the mobile devices in the defined area.

18. A non-transitory machine-readable medium, comprising executable instructions that, when executed by a processor of an apparatus, facilitate performance of operations, comprising:
receiving information indicative of an emergency condition in a defined area, wherein the emergency condition is one of emergency conditions; and
transmitting a command signal to a network device for the defined area to cause a base station device to switch communication for the emergency condition to a first wireless communication channel with a mobile device of mobile devices from a second wireless communication channel, wherein the command signal identifies a first frequency for the mobile device to employ for a first defined application for the emergency condition and a second frequency for the mobile device to employ for a second defined application for the emergency condition, and wherein the first wireless communication channel has been designated for use for the emergency conditions prior to occurrence of the emergency condition.

19. The non-transitory machine-readable medium of claim 18, wherein the mobile device is associated with a subscriber identity of subscriber identities, wherein the communications are first communications, and wherein the operations further comprise:
analyzing a repository comprising data identifying the mobile devices associated with the subscriber identities; and
based on a result of the analyzing, determining that the mobile device is a device associated with the subscriber identity of the subscriber identities assigned to provide the response to the emergency condition in the defined area.

20. The machine-readable medium of claim 18, wherein transmitting the command is based on switching from a second wireless communication channel via which the base station device was communicating with the mobile device prior to receiving the information indicative of the emergency condition in the defined area.

* * * * *